(12) United States Patent
Yagil et al.

(10) Patent No.: US 10,511,345 B2
(45) Date of Patent: Dec. 17, 2019

(54) DOWNSTREAM INTERFERENCE SUPPRESSION IN FULL-DUPLEX COMMUNICATIONS

(71) Applicant: Capacicom Ltd., Kfar Netter (IL)

(72) Inventors: Ariel Yagil, Ein Sarid (IL); Daniel Wajcer, Beit-Yehoshua (IL); Naor Goldman, Zoran (IL)

(73) Assignee: Capacicom Ltd., Kfar Netter (IE)

( * ) Notice: Subject to any disclaimer, the term of this patent is extended or adjusted under 35 U.S.C. 154(b) by 0 days.

(21) Appl. No.: 15/965,927

(22) Filed: Apr. 29, 2018

(65) Prior Publication Data

US 2018/0343031 A1 Nov. 29, 2018

Related U.S. Application Data

(60) Provisional application No. 62/510,285, filed on May 24, 2017.

(51) Int. Cl.
*H04B 3/23* (2006.01)
*H04L 5/14* (2006.01)

(52) U.S. Cl.
CPC ............. *H04B 3/232* (2013.01); *H04L 5/143* (2013.01); *H04L 5/1461* (2013.01)

(58) Field of Classification Search
CPC . H04B 1/525; H04B 3/32; H04B 3/23; H04B 1/10; H04B 1/123; H04B 3/50; H03F 1/3247; H03F 1/3282; H04N 21/6118; H04N 21/6168
See application file for complete search history.

(56) References Cited

U.S. PATENT DOCUMENTS

| | | | |
|---|---|---|---|
| 6,704,349 B1 | 3/2004 | Masenten | |
| 8,175,535 B2 * | 5/2012 | Mu | H04B 1/123 455/283 |
| 8,249,536 B2 | 8/2012 | Jung et al. | |
| 8,400,234 B2 | 3/2013 | Yang et al. | |
| 8,462,836 B2 | 6/2013 | Choi | |

(Continued)

OTHER PUBLICATIONS

Cable Television Laboratories, "Data-Over-Cable Service Interface Specifications: Physical Layer Specification, DOCSIS® 3.1", CM-SP-PHYv3.1-I13-171220, Annex F, 295 pages, Dec. 20, 2017.

*Primary Examiner* — Mohamed A Kamara
(74) *Attorney, Agent, or Firm* — Kligler & Associates

(57) ABSTRACT

An apparatus includes a transmitter, a receiver and a combining element. The transmitter includes multiple coupling devices coupled to a coaxial network via multiple respective ports, and is configured to transmit multiple transmit signals via the coupling devices, and to receive from the coaxial network via the multiple coupling devices multiple reception signals. The receiver is configured to receive a combined signal of the multiple reception signals, interfered by multiple respective interfering signals that originate from the multiple transmit signals, and to process the combined signal to recover data carried in the reception signals. The combining element, included in at least one of the transmitter and the receiver, is configured to receive the multiple reception signals from the respective couplers, and to generate the combined signal with a suppressed level of the interference signals by setting at least a phase of at least one of the reception signals.

22 Claims, 3 Drawing Sheets

(56) References Cited

U.S. PATENT DOCUMENTS

| | | |
|---|---|---|
| 8,463,201 B2 | 6/2013 | Jung et al. |
| 8,743,745 B2 | 6/2014 | Sarca |
| 10,063,363 B2 | 8/2018 | Negus et al. |
| 2010/0048146 A1 | 2/2010 | McCallister |
| 2012/0195351 A1* | 8/2012 | Banwell ................. H04B 1/525 |
| | | 375/219 |
| 2014/0269864 A1 | 9/2014 | Aparin |
| 2016/0036490 A1* | 2/2016 | Wu .......................... H04B 3/32 |
| | | 375/257 |
| 2016/0156381 A1* | 6/2016 | Rydstrom .............. H04B 1/525 |
| | | 370/286 |
| 2016/0308562 A1 | 10/2016 | Wyville et al. |
| 2016/0308661 A1* | 10/2016 | Liebl .................... H04L 5/1461 |
| 2017/0237491 A1* | 8/2017 | Mutalik ............. H04B 10/2503 |
| | | 398/115 |
| 2018/0294941 A1* | 10/2018 | Chapman ................ H04L 5/003 |

* cited by examiner

DOWNSTREAM INTERFERENCE SUPPRESSION IN FULL-DUPLEX COMMUNICATIONS

CROSS-REFERENCE TO RELATED APPLICATIONS

This application claims the benefit of U.S. Provisional Patent Application 62/510,285, filed May 24, 2017, whose disclosure is incorporated herein by reference.

TECHNICAL FIELD

Embodiments described herein relate generally to communication systems, and particularly to methods and systems for interference suppression in full duplex communication.

BACKGROUND

In various communication systems the performance of a receiver is degraded by interfering signals originating from a transmitter. Methods for suppressing such interference are known in the art. For example, U.S. Patent Application Publication 2017/0237491 describes systems and methods for achieving full duplex bidirectional transmission across coaxial cable in a hybrid fiber-coaxial cable TV network. Some disclosed systems and methods attenuate reflections propagated within the coaxial cable. Other systems may echo-cancel reflections propagated within the coaxial cable.

An international telecommunications standard, referred to as "Data Over Cable Service Interface Specification" (DOCSIS), developed by CableLabs and contributing companies, specifies the transfer of high-bandwidth data over existing cable TV (CATV) systems. In 2017, a Full Duplex (FDX) version of DOCSIS version 3.1 has been announced, in which at least part of the spectrum of the cable plant can be used simultaneously in both upstream and downstream directions. The physical layer of the DOCSIS 3.1 standard, including FDX, is specified, for example, in Annex F of the specifications "Data-Over-Cable Service Interface Specifications DOCSIS® 3.1, Physical Layer Specification," CM-SP-PHYv3.1-I13-171220, December 2017.

SUMMARY

An embodiment that is described herein provides an apparatus that includes a transmitter, a receiver and a combining element. The transmitter includes multiple coupling devices coupled to a coaxial network via multiple respective ports. The transmitter is configured to transmit multiple transmit signals via the respective coupling devices, and to receive from the coaxial network via the multiple coupling devices multiple respective reception signals. The receiver is configured to receive a combined signal of the multiple reception signals, interfered by multiple respective interfering signals that originate from the multiple transmit signals, and to process the combined signal to recover data carried in the multiple reception signals. The combining element is included in at least one of the transmitter and the receiver and is configured to receive the multiple reception signals from the respective couplers, and to generate the combined signal with a suppressed level of the interference signals by setting at least a phase of at least one of the reception signals.

In some embodiments, the interference signals are caused by leakage of the respective transmit signals to the receiver at least via the respective couplers, and the combining element is configured to suppress the interference signals by exploiting a coherency among the interference signals inherited from the transmit signals. In other embodiments, the combining element is configured to generate the combined signal by combining the multiple reception signals in pairs, so that the reception signals of each pair are combined with a 180 degree phase shift using a respective anti-phase combiner. In yet other embodiments, the combining element includes multiple compensation elements that compensate for path differences among the ports by setting each compensation element with one or more signal parameters selected from a list including a phase parameter, a gain parameter and a delay parameter of a respective reception signal, prior to combining.

In an embodiment, the combining element is configured to adaptively modify a setting of the compensation elements in an attempt to minimize a level of the interference signals. In another embodiment, the combining element is configured to monitor a performance level of the receiver, and to adjust the setting of the compensation elements based on the monitored performance level. In yet another embodiment, the transmitter is configured to generate the multiple transmit signals in a digital domain of the transmitter, and to set signal parameters of the reception signals by setting the signal parameters of the respective transmit signals in the digital domain of the transmitter.

In some embodiments, the transmitter is configured to select a signal parameter to set in a transmit signal from a list including a phase parameter, a gain parameter and a delay parameter. In other embodiments, the transmitter is configured to modify the signal parameters of the transmit signals, based on monitoring a performance level of the receiver.

There is additionally provided, in accordance with an embodiment that is described herein, a method including transmitting via multiple coupling devices of a transmitter multiple transmit signals to a coaxial network via multiple respective ports, and receiving from the coaxial network via the multiple ports multiple respective reception signals. A combined signal of the multiple reception signals, interfered by multiple respective interfering signals that originate from the multiple transmit signals, is received in a receiver. The combined signal is processed to recover data carried in the multiple reception signals. The multiple reception signals are received from the coaxial network via the respective ports, and the combined signal is generated with a suppressed level of the interference signals by setting at least a phase of at least one of the reception signals.

These and other embodiments will be more fully understood from the following detailed description of the embodiments thereof, taken together with the drawings in which:

DETAILED DESCRIPTION OF EMBODIMENTS

Overview

Figure 1:
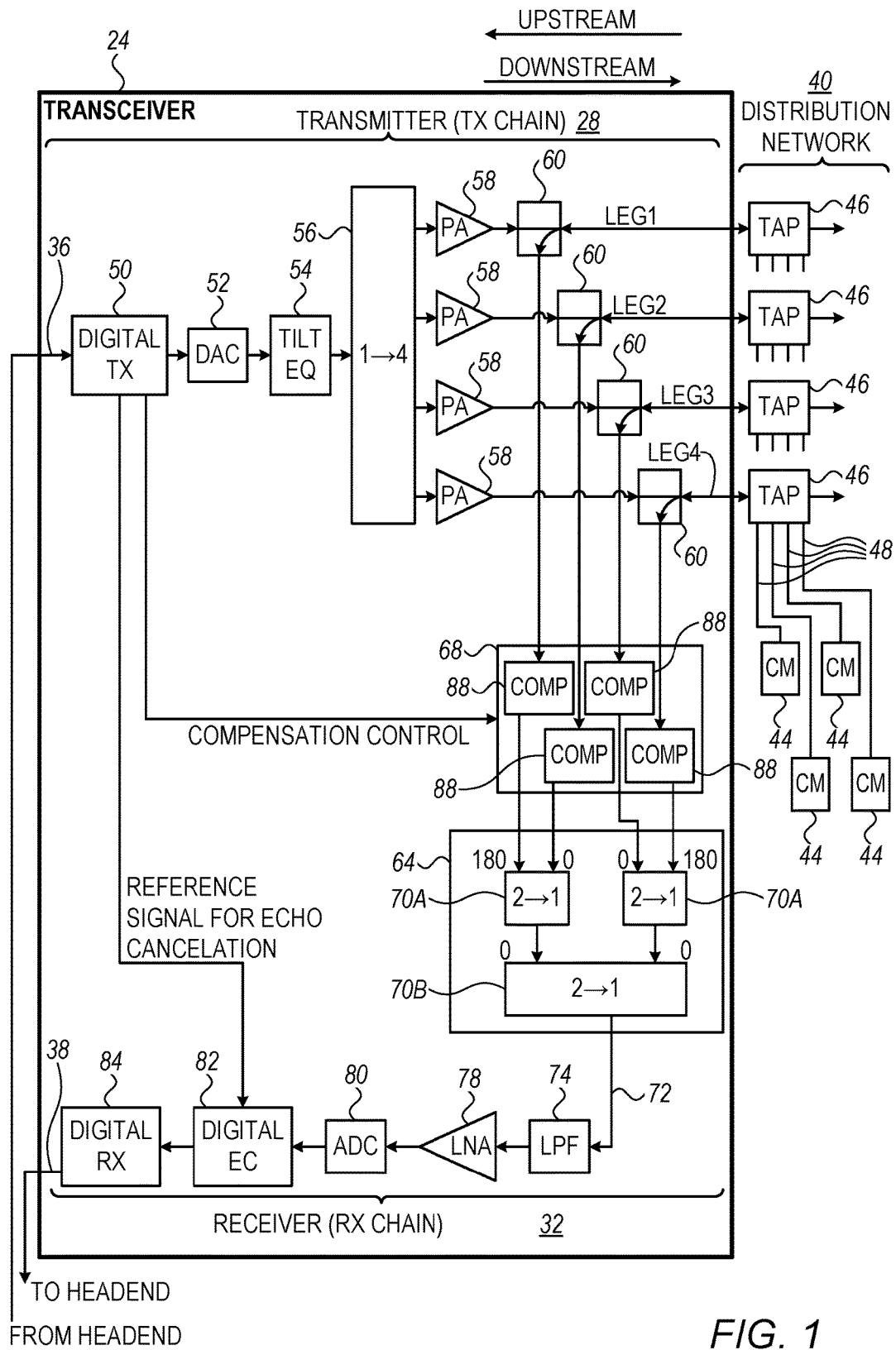
FIG. 1 is a block diagram that schematically illustrates a transceiver that supports interference suppression in full duplex mode, in accordance with an embodiment that is described herein.

Embodiments that are described herein provide improved methods and systems for suppressing interference in a transceiver operating in full duplex.

A transceiver is a communication apparatus comprising a transmitter and a receiver. For example, in a cable TV system, a network node in a Hybrid Fiber-Coaxial (HFC) network typically comprises a transceiver that communicates with a headend over an optical fiber on one end, and with end users equipped with Cable Modems (CMs) over a coaxial-based communication network on the other end.

The FDX DOCSIS 3.1 standard cited above specifies a full-duplex mode over part of the cable-plant spectrum (also referred to as the FDX Band). The full duplex mode fully exploits time/frequency resources of the bi-directional communication channel. In some disclosed embodiments, for achieving acceptable receiver performance in the full duplex mode, interference caused to the receiver by the transmitter is canceled or suppressed, as will be described in detail below.

The transmitter may interfere with the receiver because the signal transmitted by the transmitter is much stronger than the signal received at the receiver. For example, a portion of the transmitted signal may leak to the receiver, e.g., due to imperfect isolation. The transmitted signal may also be reflected back to the receiver from an antenna or a connector at the transmitter output, or by various elements of the communication network, e.g., due to imperfect impedance matching at the point of reflection. In the present context, the term "reflection" refers to an attenuated and delayed replica of the transmitted signal. The term "reflection" is also referred to as "echo."

In some embodiments, the transceiver comprises multiple coupling devices coupled to a coaxial network via multiple respective ports, also referred to herein as "legs." The coupling devices transmit to the coaxial network multiple respective downstream signals originating in the transmitter, and receive from the coaxial network multiple respective upstream signals originating from the end devices. A portion of a downstream signal that leaks, e.g., via the coupling device, to the respective upstream receive path is also referred to herein as a "leakage signal." A portion of a downstream signal that is reflected due to impedance mismatches along the transmit paths via the legs is also referred to herein as an "echo signal." Note that the delay of the leakage signals relative to the downstream signal from which they originate is typically much shorter than the delay of the echo signals.

In some embodiments, the multiple downstream signals comprise multiple signal-copies of a common downstream signal generated in the transmitter, and are therefore mutually coherent. Moreover, the coherency property is inherited by the leakage signals interfering with the upstream signals. The echo signals are typically non-coherent because they are reflected in different branches of the network.

In the context of the present disclosure and in the claims, the term "coherent" refers to signals having the same (or closely similar) waveform (possibly up to gain, phase or delay corrections). Identical signals can be eliminated by subtraction in pairs. In practice, due to mismatch among the signals, the subtraction operation does not eliminate the signals completely, but reduces their level considerably. Signal subtraction can be implemented, for example, using an anti-phase combiner that shifts the signal phase at one of its two inputs by 180°.

Coherent signals are also referred to herein as "matching signals," in a sense that signals that match perfectly can be eliminated by subtraction. Signals that approximately match are also referred to herein as "partially coherent" or "partially matching" and slightly differ from one another in gain, phase and/or delay. Partially matching signals result in some residual signal by subtraction, wherein the residual signal is significantly weaker than the signals being subtracted. The coherency level between signals is equivalently regarded to as the matching level between the signals, based on a suitable matching criterion. As will be described below, partially matching signals can be canceled or nearly canceled by subtraction in pairs possibly with pre-correcting at least one of their respective amplitudes, phases and delays.

In the disclosed embodiments we refer mainly to embodiments in which the upstream transmissions are scheduled so that a frequency resource is used by only a single leg at any given time. Since the upstream signals are separated in frequency, the receiver can combine the multiple upstream signals into a combined upstream signal that is processed using a single Analog to Digital Converter (ADC), which saves costs as well as power consumption.

Combining the upstream signals may degrade the signal-to-interference ratio at the combiner output. In case of a four-leg node, the respective leakage signals are combined coherently, resulting in a 12 dB gain relative to the insertion loss of the combiner module. The echo signals are combined non-coherently, resulting in a gain of about 6 dB. The contribution of the leakage signals to the interference is therefore typically accentuated compared to the echo signals, depending on the characteristics of the couplers used and on the cable plant. In the disclosed embodiments, the receiver suppresses the interference signals at the combiner output by exploiting the coherency among the leakage signals inherited from the downstream signals.

In some embodiments, the receiver generates the combined signal by combining the multiple upstream signals in pairs, wherein the upstream signals of each pair are combined with a 180 degree phase shift using a respective anti-phase combiner. In some embodiments, the upstream signals are processed using respective compensation elements prior to combining, for compensating for differences among the leg paths. In such embodiments, each compensation element sets one or more signal parameters: a phase parameter, a gain parameter and a delay parameter of a respective upstream signal. The setting of the compensation elements is determined so as to minimize the level of the interference signals at the combiner output. The parameters of the compensation elements may be set once, or modified adaptively, e.g., based on monitoring the reception performance of the receiver.

In some embodiments, the transmitter generates the multiple downstream signals in the digital domain of the transmitter. In such embodiments, the upstream signals can be combined using an in-phase combiner, and the transmitter controls the phase, gain and delay parameters of the upstream signals by setting the parameters of the respective downstream signals in the digital domain. The transmitter may modify the parameters of the downstream signals adaptively, based on monitoring the reception performance of the receiver.

By using the disclosed techniques, leakage interference that is typically enhanced by a combiner is suppressed significantly, by applying anti-phase combining to the interfered upstream signals in pairs. As a result, the receiver performance improves and the dynamic range requirements of the receiver front end are reduced.

System Description

FIG. 1 is a block diagram that schematically illustrates a transceiver 24 that supports interference suppression in full duplex mode, in accordance with an embodiment that is described herein. In the present example, transceiver 24 operates in a cable TV (CATV) communication system, e.g., in a headend or node that distributes content to multiple subscribers and/or provides bidirectional access to the Internet. Alternatively, transceiver 24 may operate in any other suitable communication system.

In the example of FIG. 1, transceiver 24 is comprised in a node that is coupled to a headend of a CATV system on one end, and to a distribution network 26 on the other end. The communication network via which the node communicates with the headend typically comprises an optical fiber network, but other suitable networks can also be used. Alternatively, the node (or transceiver) may be comprised in the headend.

Transceiver 24 comprises a transmitter 28 that receives TX data, e.g., a TX bit stream 36, from the headend, converts the TX data into downstream signals, and transmits the downstream signals to a distribution network 40. Transceiver 24 further comprises a receiver that receives upstream signals from the distribution network, recovers from the upstream signals RX data, e.g., a RX bit stream 38, and transmits the RX data to the headend. The transceiver typically communicates the TX data and RX data with the headend using a suitable interface (not shown) in accordance with any suitable protocol, e.g., communicating the TX and RX bit streams within suitable packets.

In the example of FIG. 1, distribution network 40 comprises a wired-based distribution network that allows bidirectional communication between transceiver 24 and remote subscriber devices such as Cable Modems (CMs) 44. Alternatively or additionally, any other suitable subscriber devices such as set top boxes (not shown) that are compliant with the DOCSIS specifications can also be used, e.g., in Internet Protocol TV (IPTV) applications. In the present example, distribution network 40 comprises taps 46 connected using coax cables, wherein each tap 46 connects to one or more respective CMs 44 via respective drop cables 48.

The topology of distribution network 40 typically comprises multiple branches, wherein each branch comprises multiple taps 46, e.g., interconnected in series (not shown). A tap 46 receiving a downstream signal from transceiver 24, forwards a portion of the downstream signal to each of its interconnected CMs via respective drop cables 48, and possibly to a successive tap. A tap receiving an upstream signal from a CM via a drop cable, or from another tap, forwards the upstream signal to the transceiver possibly via one or more additional taps.

In the transmit direction (downstream), a digital transmitter 50 receives TX bit stream 36 from the headend, and processes the TX bit stream for transmission. In processing the TX bit stream, the digital transmitter modulates the TX bit stream using any suitable modulation scheme. A Digital to Analog Converter (DAC) 52 converts the modulated downstream signal into an analog downstream signal. In some embodiments, the digital transmitter modulates the downstream signal using a Frequency-Division Multiplexing (FDM) modulation scheme that assigns to multiple downstream channels (e.g., TV channels) multiple respective non-overlapping frequency bands. In an example embodiment, the downstream signal carries multiple channels that are modulated using an Orthogonal Frequency-Division Multiplexing (OFDM) scheme, e.g., in accordance with the DOCSIS specifications.

In some embodiments, transmitter 28 comprises an up-tilt equalizer 54 that emphasizes high frequencies of the downstream signal to achieve an approximately flat frequency response over the used bandwidth at the CMs' inputs.

In the present example, transmitter 28 comprises a splitter 56 that splits the analog downstream signal into four signal-copies that are amplified separately by respective Power Amplifiers (PAs) 58. In alternative embodiments, splitter 56 splits the downstream signal into any suitable number of signal-copies other than four. Using multiple PAs rather than a single PA is required, for example, when the power produced by a single PA is insufficient for driving more than a single branch of the distribution network.

The outputs of PAs 58 are coupled to distribution network 40 via respective couplers 60 and respective ports, also referred to herein as "legs" that are denoted LEG1 . . . LEG4 in the figure. Each of the legs typically comprises a Radio Frequency (RF) connector. Each of legs LEG1 . . . LEG4 is coupled to a branch of the distribution network that comprises one or more interconnected taps 46.

In the receive direction, receiver 32 receives respective upstream signals from the distribution network via LEG1 . . . LEG4 and respective couplers 60. Each coupler 60 comprises an input port coupled to a respective PA 58 output, an output port coupled to a respective leg, and a sampling port for outputting an upstream signal.

In some embodiments, the upstream signal carries multiple upstream channels modulated using a suitable FDM modulation scheme that assigns to the upstream channels multiple respective non-overlapping frequency bands. In an example embodiment, the upstream channels are modulated using an Orthogonal Frequency-Division Multiple Access (OFDMA) scheme, e.g., in accordance with the DOCSIS specifications.

Coupler 60 delivers a downstream signal from the input port to the output port, and an upstream signal from the output port to the sampling port of the coupler. In practice, coupler 60 has a limited isolation level between its input port and sampling port, and therefore a portion of the downstream signal typically leaks from the input port to the sampling port of the coupler, thus degrading the respective upstream signal.

A signal that is derived from the downstream signal and that leaks to the receiver is also referred to herein as a "leakage signal." The interference caused by the leakage signals is also referred to as "leakage interference." In general, the downstream signal leaks to the receiver via a coupler 60, but other leakage paths are possible.

A combining module 64 combines the multiple upstream signals, possibly after the upstream signals are processed by a compensation module 68, to produce a combined upstream signal 72. In combining the upstream signals, combining module 64 suppresses interference caused by leakage of the downstream signals using anti-phase combining, as will be described below. In some embodiments, compensation module 68 processes the upstream signals prior to combining by module 64 so as to improve the interference suppression. Using a compensation module 68 is not mandatory, and may be omitted, in an embodiment.

In some embodiments, receiver 32 filters combined upstream signal 72 using a Low Pass Filter (LPF) 74, and amplifies the filtered signal using a Low Noise Amplifier (LNA) 78. In an alternative embodiment, the combined upstream signal is first amplified by LNA 78 and then filtered by LPF 74. Note that although commonly used, LPF 74, LNA 78 or both can be omitted, in an embodiment. In the example of FIG. 1, the combined upstream signal output by LNA 78 is then sampled and converted by an Analog to Digital Converter (ADC) 80 into a digital form.

In alternative embodiments, each upstream signal received from a respective leg is filtered separately by a respective LPF such as LPF 74, and amplified using a respective LNA such as LNA 78. For example, an upstream signal may be low-pass filtered and/or amplified using an LNA positioned between coupler 60 and the compensation module, or between the compensation module and the combining module.

The signal-copy split from the downstream signal via splitter 56, and transmitted via a respective coupler 60 to the distribution network, may be reflected by elements of the network branch to which the coupler connects. As a result, each of the upstream signals provided respectively via couplers 60 may contain one or more reflections of the respective signal-copy. Since the network branches comprise different structure and elements, the characteristics of the reflections are unique per each upstream signal in terms of gain, phase and delay.

In the example of FIG. 1, a digital Echo Cancelation (EC) module 82, receives a reference signal from digital transmitter 50 and the combined upstream signal from ADC 80. Digital EC 82 typically comprises a digital filter whose impulse response function (or frequency response function) emulates the echo path between the reference point in the digital transmitter, via distribution network 40 and back to the output of ADC 80 in receiver 32. The digital filter can be implemented in the time domain or in the frequency domain. The digital filter of the EC processes the reference signal to recover a suppression signal that closely resembles the actual echo signal, and subtracts the suppression signal from the upstream signal to suppress the interference caused by the reflections.

In some embodiments, the transceiver comprises an analog EC module (not shown) instead of or in addition to digital EC 82. The analog EC receives a reference signal from the output of DAC 52 (or from an additional DAC coupled to the output of digital transmitter 50) and its output is subtracted from the combined upstream signal.

A digital receiver 84 receives the combined upstream signal from digital EC 82, processes the upstream signal to recover RX bit stream 38, and transmits the RX bit stream to the headend.

Interference Suppression in Full Duplex

Figure 2:
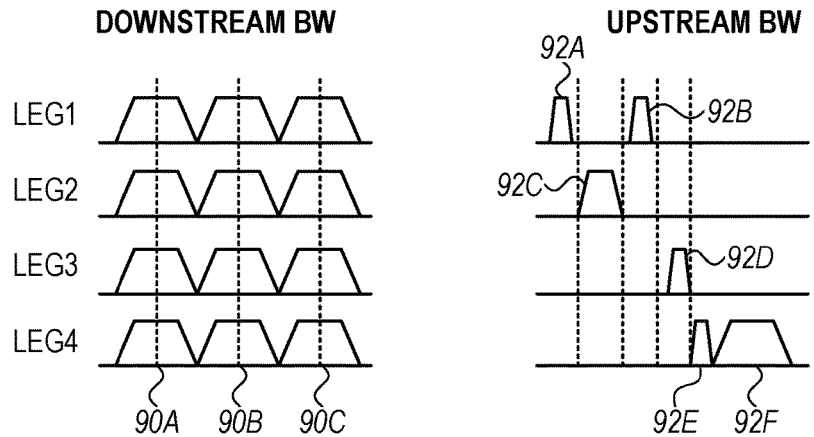
FIG. 2 is a diagram that schematically illustrates downstream and upstream bandwidth usage in full duplex mode, in accordance with an embodiment that is described herein.

FIG. 2 is a diagram that schematically illustrates downstream and upstream bandwidth usage in full duplex mode, in accordance with an embodiment that is described herein. As depicted in FIG. 1, each of legs LEG1 . . . LEG4 carries both downstream signals toward the distribution network and upstream signals received from the distribution network. In full duplex mode, the downstream signals and the upstream signals may share a common portion of the bandwidth simultaneously, to better exploit bandwidth resources.

As described above, in the downstream direction, transmitter 28 splits a downstream signal into multiple (e.g., four) signal-copies that are transmitted to the distribution network via the respective legs. In the example of FIG. 2, the downstream signal contains three downstream channels that occupy respective frequency bands 90A, 90B and 90C.

As depicted in FIG. 2, the downstream bandwidth content is designed to be the same among LGE1 . . . LEG4. In practice, however, the downstream signals transmitted via LEG1 . . . LEG4 may slightly differ from one another, due to imperfect splitting by splitter 56 and due to differences among PAs 58 and couplers 60 of the respective legs.

In the upstream direction, the upstream signals received from the distribution network, are scheduled so that at any given time, a frequency band assigned to a CM that connects to a given leg is not assigned simultaneously to any CM that connects to another leg. Different CMs coupled to a common leg may use different frequency bands. In the example of FIG. 2, CMs connected to LEG1 use frequency bands 92A and 92B, CMs connected to LEG2 and LEG3 use frequency bands 92C and 92D, respectively, and CMs connected to LEG4 use frequency bands 92E and 92F.

In some embodiments, transceiver 24 operates in a full duplex mode, e.g., in accordance with the FDX version of the DOCSIS 3.1 standard cited above. In such embodiments, CMs 44 connected to LEG1 . . . LEG4 share a common DOCSIS service group as specified in the FDX DOCSIS 3.1 standard. The legs serving a given service group transmit the same downstream signal, and receive respective upstream signals assigned to different time/frequency resources, i.e., mini-slots containing multiple subcarriers.

Note that since the frequency bands used by the upstream signals received via LEG1 . . . LEG4 are non-overlapping, these upstream signals can be combined without interfering with one another. This architecture is advantageous because a single ADC (e.g., ADC 80) can handle multiple upstream signals.

As explained above, the downstream transmissions may interfere with the upstream signals due to power leakage from the transmitter to the receiver, and due to reflections from the distribution network.

In the downstream direction the signals output by PAs 58 may leak through couplers 60 into the RX chain and degrade the receiver performance. In addition, due to impedance mismatch, the downstream signal transmitted via each of the node legs may be reflected as an echo from the respective RF connector and/or by taps 46 and other elements in the distribution network to which the leg connects. In general, the receiver experiences an interference that is the sum of the individual interferences associated with the different legs.

Since PAs 58 transmit at a power level that is typically significantly higher than the typical receive level, the level of the interference caused by leakage and reflections of the downstream signal is much higher than the received upstream signal, and therefore the dynamic range of the receiver, e.g., of LNA 78 and ADC 80, should be designed sufficiently high to accommodate that signal to interference power difference. In the description that follows we describe embodiments that improve the signal to interference ratio at the receiver, and therefore can improve the receiver performance, relax the dynamic rage requirements, or both. Reducing the dynamic range requirements of the LNA and ADC indirectly improves the receiver performance, lowers the system's cost and/or reduces the system's power consumption.

Consider, for example, a reference embodiment in which the upstream signals are combined using a combiner that combines all its inputs in-phase. Since the upstream signals occupy different frequency bands, they are combined with no gain. As noted above, the leakage signals at the sampling ports of couplers 60 are matching, and are therefore combined coherently. Since the reflection signals are essentially delayed and attenuated replicas of a common downstream signal, wherein each reflection signal typically has a different delay and attenuation, the reflection signals would be combined with a lower gain than the leakage signals.

In case of combining four upstream signals, the power gain (relative to the upstream signal) associated with the leakage interference is 12 dB (due to amplitude gain factor of 4, or a power gain factor of 16) and the power gain of the reflection signals is about 6 dB.

Let U denote the power density of the upstream signal transmitted by a CM, measured, for example, in units of [W/Hz] (Watts per Hertz). Let DL[W/Hz] denote the power density of the leakage signal per leg, and DR[W/Hz] the power density of the reflection signal per leg. The signal-to-interference ratio per leg is given by U/(DL+DR). The signal-to-interference ratio at the output of the in-phase combiner of the reference embodiment is given by U/(16·DL+4·DR). Assuming that DL=DR (as an example), the signal-to-interference ratio in the reference embodiment degrades by a factor of 2/(16+4), i.e., −10 dB relative to an embodiment in which the upstream signals are processed individually with no combining.

In the transceiver embodiment of FIG. 1, receiver 32 combines the upstream signals with improved signal-to-interference ratio using combining module 64, which combines pair of upstream signals with a 180° phase shift. Combining module 64 comprises two anti-phase combiners 70A, each of which combines two upstream signals of two respective legs. Anti-phase combiner 70A performs anti-phase combining, by applying a 180° shift to one of its inputs. As a result, the leakage signals of the respective upstream signals are canceled out or significantly suppressed. An in-phase combiner 70B combines the outputs of anti-phase combiners 70A to produce the upstream combined signal 72. This configuration can be extended in a similar manner to any even number of upstream signals. In an alternative embodiment, in-phase combiner 70B is replaced by an anti-phase combiner, e.g., such as anti-phase combiner 70A.

In practice, due to imperfect matching among the paths of the respective legs, the leakage signals are typically not canceled out completely, but are attenuated considerably. The signal-to-interference ratio at the output of combining module 64 is given by U/(α·DL+4DR), wherein a is a positive number much smaller than unity. The actual value of α depends on the coherence level between leakage signals of the combined upstream signals in each pair, and on the precision of the anti-phase combiners. For example, for α=0.1, and assuming DL=DR, the signal-to-interference ratio is U/(4.1·DL), i.e., improving over the reference embodiment (that combines all of the upstream signals in-phase) by about 7 dB.

The configuration of combining module 64 depicted in FIG. 1 is not mandatory, and other suitable configurations can also be used. In an alternative embodiment, two pairs of upstream signals are first combined using respective in-phase combiners such as 70B (i.e., instead of anti-phase combiners 70A of FIG. 1) and an anti-phase combiner 70A combines the two outputs of in-phase combiners 70B. This scheme is similar to combining module 64 depicted in FIG. 1, but replaces the roles of anti-phase combiners 70A and in-phase combiner 70B. This embodiment has the same or similar performance as combining module 64 of FIG. 1.

In some embodiments, the number of legs (N) is odd. In such embodiments, N−1 of the upstream signals are combined in pairs using (N−1)/2 anti-phase combiners 70A. The remaining upstream signal (attenuated by a value equal to the insertion loss of the anti-phase combiners) plus the (N−1)/2 outputs of the anti-phase combiners are combined in-phase using an in-phase combiner having [1+(N−1)/2] inputs. The suppression level of the leakage signals in this embodiment improves with N.

As noted above, the leakage signals are typically not eliminated completely by combining module 64. In some embodiments, to improve the suppression level of the leakage signals, the upstream signals are processed using compensation module 68 before being combined by combining module 64. Compensation module 68 comprises multiple compensation elements 88, wherein each compensation element processes an upstream signal of a respective leg. Compensation elements 88 are configured to modify at least one of the gain, phase and delay of the respective upstream signals. The delay that can be applied by the compensation elements is typically insufficient for compensating for the delays of the echo signals.

In some embodiments, the gain, phase and delay values applied by compensation elements 88 are calibrated once, e.g., at factory. For example, a common signal may be injected into the four legs, and the gain, phase and delay configurations of the compensation elements 88 are adjusted to achieve maximal suppression of the injected signals at the output of combining module 64. Alternatively, the calibration procedure described above may be performed occasionally as an off-line maintenance procedure.

In alternative embodiments, the transceiver modifies the setting of at least one of the gain, phase and delay parameters of one or more of compensation elements 88, in parallel to transmitting downstream signals and receiving upstream signals. In some embodiments, the transceiver controls the configurable parameters of the compensation elements based on measuring the reception performance of receiver 32. For example, the transceiver may attempt multiple predefined configurations of compensation elements 88 and select the configuration that maximizes the receiver performance. Controlling the parameter settings of compensation elements 88 can be performed, for example, by transmitter 28, or by any suitable processor of the transceiver (not shown).

Controlling the Suppression of Leakage Signals by the Transmitter

Figure 3:
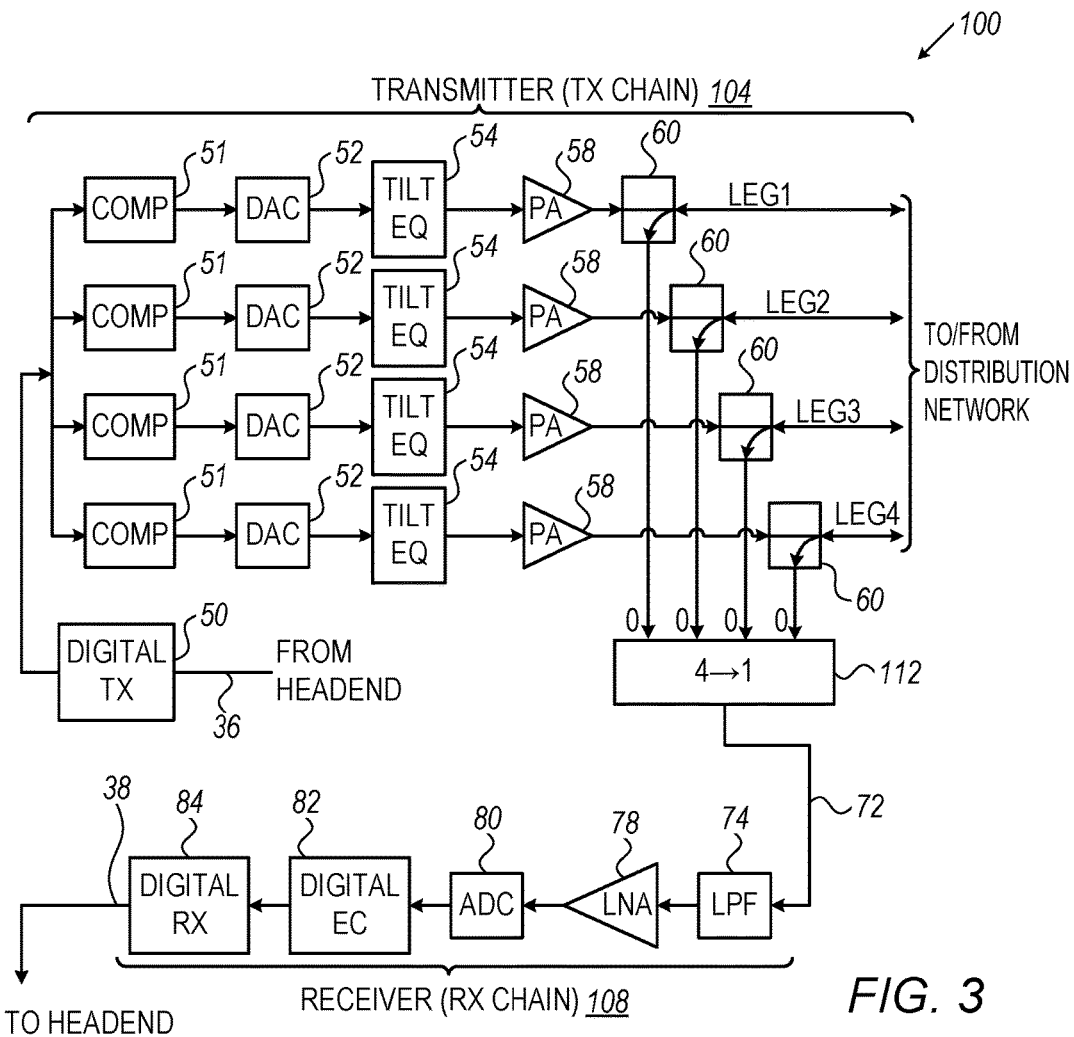
FIG. 3 is a block diagram that schematically illustrates a full duplex transceiver that controls interference suppression digitally, in accordance with an embodiment that is described herein.

FIG. 3 is a block diagram that schematically illustrates a full duplex transceiver 100 that controls interference suppression digitally, in accordance with an embodiment that is described herein.

Transceiver 100 comprises a transmitter 104 and a receiver 108. Transceiver 100 implements an alternative embodiment to transceiver 24 of FIG. 1. In transceiver 100, the downstream signal is split into four signal-copies digitally by digital transmitter 50, i.e., in the digital domain of the transmitter. In the downstream direction, a compensation operation is applied to each of the signal-copies by a respective compensation module 51, and the compensated signal is converted to analog form using a respective DAC 52, and processed for transmission to the distribution network via a respective leg, using up-tilt equalizer 54, PA 58 and coupler 60. Compensation modules 51 may be similar to compensation modules 88 of FIG. 1, and are configured to modify (when required) the gain, phase and/or delay of the signal-copies. Compensation modules 51 are controlled by digital transmitter 50, as will be described below.

In the upstream direction, the upstream signals of LEG1 ... LEG4 are combined using an in-phase combiner 112. Combiner 112 may comprise, for example, a hierarchy of in-phase combiners starting with combining the upstream signals in pairs.

Using the architecture of FIG. 3, digital transmitter 50 controls the individual gain, phase and delay parameters of each signal-copy of the downstream signal. For example, the digital transmitter applies a 180° phase shift to two of the signal-copies, e.g., associated with LEG1 and LEG4. In some embodiments, the digital transmitter additionally adjusts the gain, phase and/or delay of the signal-copy of each leg in order to compensate for mismatch among the legs, similarly to compensation module 68 of FIG. 1.

In some embodiments, compensation modules 51 are omitted, in which case the digital transmitter directly controls the gain, phase and delay parameters of the signal-copies.

In some embodiments, digital transmitter 50 is configured to use predefined gain, phase and delay parameters. In alternative embodiments, the digital transmitter adaptively modifies the gain, phase and delay parameters of the respective legs, as will be demonstrated with reference to FIG. 4 below.

Figure 4:
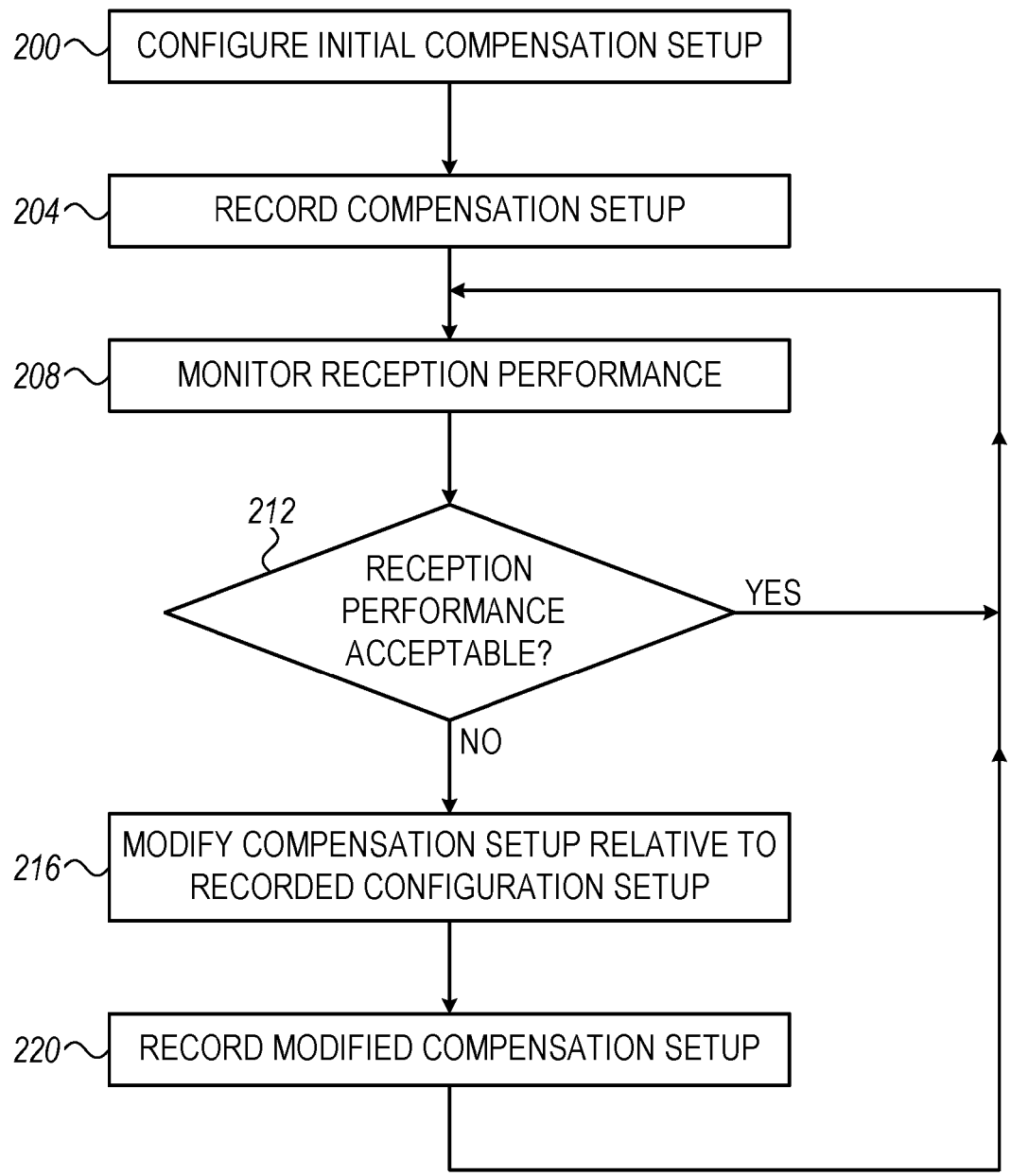
FIG. 4 is a flow chart that schematically illustrates a method for controlling interference suppression digitally in a transceiver operating in full duplex mode, in accordance with an embodiment that is described herein.

FIG. 4 is a flow chart that schematically illustrates a method for controlling interference suppression digitally in a transceiver operating in full duplex mode, in accordance with an embodiment that is described herein. The method will be described as being executed by digital transmitter 50 of transceiver 100 of FIG. 3. The digital transmitter may control the gain, phase and delay of the underlying signals directly, or using compensation modules 51, as described above.

The method begins by digital transmitter 50 configuring an initial compensation setup, at an initialization step 200, for suppressing leakage interference at the output of in-phase combiner 112. At a setup recording step 204, the digital transmitter records the initial compensation setup for reference.

The initial compensation setup defines for each of the downstream signals corresponding to the respective legs one or more of the signal parameters: phase, gain, and delay. For example, the digital transmitter applies a 180° (or close to 180°) phase shift to the downstream signals of two legs and no phase shift to the downstream signals of the other two legs. In some embodiments, in setting the initial phase, gain and delay signal parameters, the digital transmitter takes into consideration the differences between the actual leakage paths among the legs, and adjusts the signal parameters accordingly, to maximally suppress the leakage interference.

At a monitoring step 208, the digital transmitter monitors the reception performance of receiver 108, using any suitable method. In an example embodiment, the digital transmitter estimates the receiver performance by evaluating the number of erroneous bits in the recovered RX bit stream (38). In other embodiments, the transceiver analyzes the receiver performance by analyzing the residual echo at the output of digital EC 82 (specifically the short delay portion of the echo signal) to determine the echo suppression performance.

At a decision step 212, the digital transmitter checks whether the receiver performance is acceptable, e.g., by comparing the monitored performance level to a predefined performance threshold. The performance of the receiver may vary over time due to various reasons such as aging of elements, varying environmental conditions such as temperature, a modification done to the structure of the distribution network, and the like.

When the performance level monitored at step 212 is acceptable, the digital transmitter loops back to step 208 to further monitor the receiver performance. Otherwise, the digital transmitter proceeds to a compensation modification step 216. At step 216, the digital transmitter modifies the signal parameters in the compensation setup, in an attempt to improve the receiver performance. In some embodiments, the digital transmitter modifies the signal parameters based on one or more previously recorded setup configurations and the respective receiver performance levels.

At a recording step 220, the digital transmitter records the recently selected compensation setup parameters. The digital transmitter typically also records the receiver performance level associated with the compensation setup prior to the modification. Following step 220 the digital transmitter loops back to step 208, to monitor the receiver performance in applying the modified compensation setup to the downstream signals.

In some embodiments, the method of FIG. 4 (or a similar method) is executed by digital transmitter 50 of FIG. 1. In such embodiments, the digital transmitter controls the setting of compensation modules 88.

The configurations of transceiver 24, transceiver 100, and distribution network 40 shown in FIGS. 1 and 3 are example configurations, which are chosen purely for the sake of conceptual clarity. In alternative embodiments, any other suitable transceiver and distribution network configurations can also be used.

Each of the pairs of transmitter 28 and receiver 32, and/or transmitter 104 and receiver 108, may be integrated in a single device (e.g., on a single silicon die) within transceiver 24 or 100. Alternatively, each of transmitter 28, receiver 32, transmitter 104 and receiver 108 is implemented in a separate device. Further alternatively, any other suitable partition of the elements comprised in each of transceivers 24 and 100 into separate devices can also be used.

The different elements of transceivers 24 and 100 may be implemented using suitable hardware, such as in one or more Application-Specific Integrated Circuits (ASICs) or Field-Programmable Gate Arrays (FPGAs).

In some embodiments, some elements of transceivers 24 and 100, e.g., digital transmitter 50 and digital receiver 84 can be implemented using software, or using a combination of hardware and software elements. Elements of digital transceivers 24 and 100 that are not mandatory for understanding of the disclosed techniques have been omitted from the figure for the sake of clarity.

In some embodiments, some of the functions of transceivers 24 and 100 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although the description above refers mainly to a transceiver in a headend of a cable TV system, the disclosed techniques apply similarly to other suitable content distribution systems.

Although the embodiments described herein mainly address interference suppression in communication systems based on the DOCSIS 3.1 full duplex specifications, the methods and systems described herein can also be used in other applications, such as in applying other communication technologies, in which matching or nearly matching interfering signals are combined.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A transceiver, comprising:
a transmitter coupled to a coaxial network via multiple coupling devices, the transmitter configured to transmit to the coaxial network, via the multiple coupling devices, multiple respective transmit signals that are split from a common signal; and
a receiver, configured to:
receive, via the multiple coupling devices, multiple respective reception signals that are interfered by respective leakage signals caused by local leakage of the transmit signals in the transceiver;
generate from the multiple reception signals a combined reception signal having a suppressed level of the local leakage of the transmit signals, by combining the multiple reception signals with one another while a leakage signal in at least one of the reception signals has a reversed phase relative to the leakage signal in another of the reception signals; and
process the combined reception signal to recover data carried in the multiple reception signals.

2. The apparatus according to claim 1, wherein the leakage signals are caused by leakage of the respective transmit signals to the receiver at least via the respective couplers, and wherein the receiver is configured to suppress the leakage signals by exploiting a coherency among the leakage signals inherited from the transmit signals.

3. The apparatus according to claim 1, wherein the receiver is configured to generate the combined reception signal by combining the multiple reception signals in pairs, wherein the reception signals of each pair are combined with a 180 degree phase shift using a respective anti-phase combiner.

4. The apparatus according to claim 1, wherein the receiver comprises multiple compensation elements that compensate for path differences among the reception signals, by setting each compensation element with one or more signal parameters selected from a list comprising a phase parameter, a gain parameter and a delay parameter of a respective reception signal, prior to combining.

5. The apparatus according to claim 4, wherein the receiver is configured to adaptively modify a setting of the compensation elements in an attempt to minimize a level of the leakage signals.

6. The apparatus according to claim 5, wherein the receiver is configured to monitor a performance level of the receiver, and to adjust the setting of the compensation elements based on the monitored performance level.

7. The apparatus according to claim 1, wherein the transmitter is configured to generate the multiple transmit signals in a digital domain of the transmitter, and to set signal parameters of the reception signals by setting the signal parameters of the respective transmit signals in the digital domain of the transmitter.

8. The apparatus according to claim 7, wherein the transmitter is configured to select a signal parameter to set in a transmit signal from a list comprising a phase parameter, a gain parameter and a delay parameter.

9. The apparatus according to claim 7, wherein the transmitter is configured to modify the signal parameters of the transmit signals, based on monitoring a performance level of the receiver.

10. The apparatus according to claim 1, wherein the receiver is configured to receive first and second reception signals that are interfered by respective first and second leakage signals having mutually-coherent phases, and to generate the combined reception signal by combining the first and second reception signals, including reversing a phase of the first reception signal and not reversing a phase of the second reception signal.

11. The apparatus according to claim 1, wherein a first leakage signal of the first reception signal and a second leakage signal of the second reception signal are caused by respective first and second transmit signals transmitted with anti-phase relative to one another, and wherein the receiver is configured to coherently combine the first and second reception signals.

12. A method, comprising:
transmitting to a coaxial network, via multiple coupling devices of a transmitter, multiple respective transmit signals that are split from a common signal;
receiving in a receiver, via the multiple coupling devices, multiple respective reception signals that are interfered by respective leakage signals caused by local leakage of the transmit signals in a transceiver comprising the transmitter and the receiver;
generating from the multiple reception signals a combined reception signal having a suppressed level of the local leakage of the transmit signals, by combining the multiple reception signals with one another while a leakage signal in at least one of the reception signals has a reversed phase relative to the leakage signal in another of the reception signals; and
processing the combined reception signal to recover data carried in the multiple reception signals.

13. The method according to claim 12, wherein the leakage signals are caused by leakage of the respective transmit signals to the receiver at least via the respective couplers, and wherein generating the combined reception signal comprises suppressing the leakage signals by exploiting a coherency among the leakage signals inherited from the transmit signals.

14. The method according to claim 12, wherein generating the combined reception signal comprises combining the multiple reception signals in pairs, wherein the reception signals of each pair are combined with a 180 degree phase shift using a respective anti-phase combiner.

15. The method according to claim 12, and comprising compensating for path differences among the reception signals by setting one or more signal parameters, to be applied by respective compensation elements prior to combining, wherein the one or more signal parameters are selected from a list comprising a phase parameter, a gain parameter and a delay parameter of a respective reception signal.

16. The method according to claim 15, and comprising adaptively modifying a setting of the compensation elements that determines the signal parameters applied to the reception signals by the respective compensation elements, in an attempt to minimize a level of the leakage signals.

17. The method according to claim 16, and comprising monitoring a performance level of the receiver, and adjusting the setting of the compensation elements based on the monitored performance level.

18. The method according to claim 12, and comprising generating the multiple transmit signals in a digital domain of the transmitter, and setting signal parameters of the reception signals by setting the signal parameters of the respective transmit signals in the digital domain of the transmitter.

19. The method according to claim 18, wherein setting the signal parameters of the transmit signals comprises selecting a signal parameter to set in a transmit signal from a list comprising a phase parameter, a gain parameter and a delay parameter.

20. The method according to claim 18, and comprising modifying the signal parameters of the transmit signals, based on monitoring a performance level of the receiver.

21. The method according to claim 12, wherein receiving the reception signals comprises receiving first and second reception signals that are interfered by respective first and second leakage signals having mutually-coherent phases, and wherein generating the combined reception signal comprises combining the first and second reception signals, including reversing a phase of the first reception signal and not reversing a phase of the second reception signal.

22. The method according to claim 12, wherein a first leakage signal of the first reception signal and a second leakage signal of the second reception signal are caused by respective first and second transmit signals transmitted with anti-phase relative to one another, and wherein generating the combined reception signal comprises coherently combining the first and second reception signals.

\* \* \* \* \*